(12) United States Patent
Bhamidipati

(10) Patent No.: US 9,792,305 B1
(45) Date of Patent: Oct. 17, 2017

(54) SYSTEM FOR CONTROLLING ACCESS TO STORED VALUES

(71) Applicant: AMAZON TECHNOLOGIES, INC., Seattle, WA (US)

(72) Inventor: Phanikumar Bhamidipati, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 429 days.

(21) Appl. No.: 14/528,610

(22) Filed: Oct. 30, 2014

(51) Int. Cl.
- *G06F 7/00* (2006.01)
- *G06F 17/00* (2006.01)
- *G06F 17/30* (2006.01)

(52) U.S. Cl.
CPC .. *G06F 17/30289* (2013.01); *G06F 17/30194* (2013.01)

(58) Field of Classification Search
None
See application file for complete search history.

(56) References Cited

U.S. PATENT DOCUMENTS

| | | | | |
|---|---|---|---|---|
| 8,271,736 B2* | 9/2012 | Gupta | ............ | G06F 12/121 711/133 |
| 2003/0126098 A1* | 7/2003 | Hine | ............ | G06Q 30/02 705/400 |
| 2003/0188013 A1* | 10/2003 | Nishikado | ........... | H04L 67/42 709/238 |
| 2012/0226895 A1* | 9/2012 | Anderson | ......... | G06F 21/575 713/2 |
| 2015/0010214 A1* | 1/2015 | Ishizawa | ........... | G06T 7/0042 382/106 |

* cited by examiner

*Primary Examiner* — Jau-Shya Meng
(74) *Attorney, Agent, or Firm* — Lindauer Law, PLLC

(57) ABSTRACT

Described are techniques for controlling access to values and other stored resources, and controlling the ability of processes to modify values. Upon receipt of a request to access a value, a lease may be granted to a process if available. Lease data including identifiers associated with the process and the value may be generated. The connection with the process may be terminated after granting the lease, then reestablished upon receiving a subsequent request from the process to modify the value. The value may be modified responsive to a determination of correspondence between the process identifier determined from the process requesting to modify the value and the process identifier associated with the lease data.

20 Claims, 9 Drawing Sheets

| | |
|---|---|
| 402 | ESTABLISH A CONNECTION WITH A DEVICE TO RECEIVE A REQUEST FROM A PROCESS TO ACCESS A VALUE | 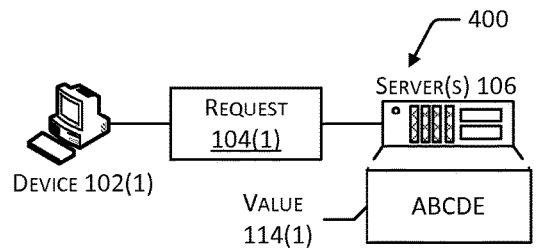 |
| 404 | DETERMINE AVAILABILITY OF A LEASE ASSOCIATED WITH THE VALUE BY DETERMINING WHETHER A COUNT OF PROCESSES ACCESSING THE VALUE EXCEEDS A MAXIMUM COUNT | 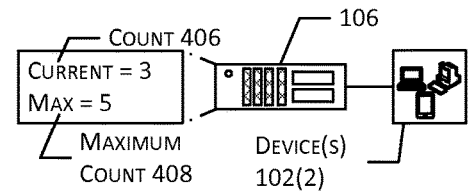 |
| 410 | GRANT A LEASE TO THE PROCESS, THE LEASE PERMITTING ACCESS BY THE PROCESS TO THE VALUE | 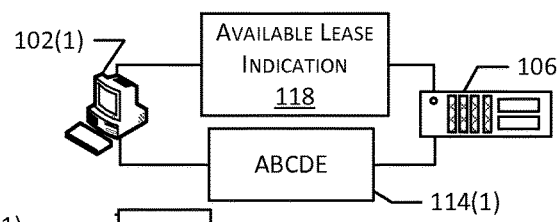 |
| 412 | GENERATE LEASE DATA USING A PROCESS IDENTIFIER AND A VALUE IDENTIFIER AND TERMINATE THE CONNECTION WITH THE PROCESS | 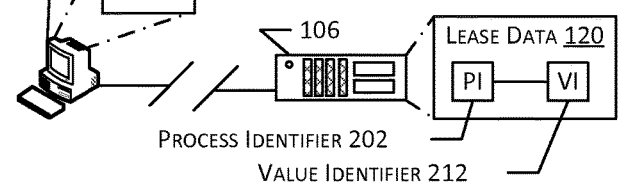 |
| 414 | RECEIVE A REQUEST FROM THE PROCESS TO MODIFY THE VALUE | 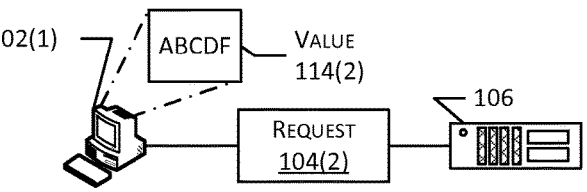 |
| 416 | DETERMINE CORRESPONDENCE BETWEEN THE PROCESS IDENTIFIER OF THE PROCESS AND THAT OF THE LEASE DATA | 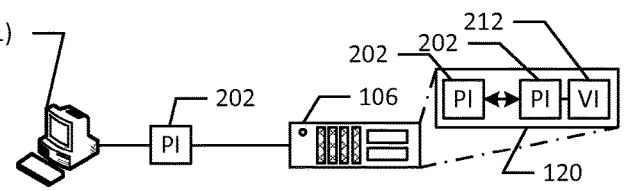 |
| 418 | REESTABLISH A CONNECTION WITH THE PROCESS TO RECEIVE A MODIFICATION TO THE VALUE | 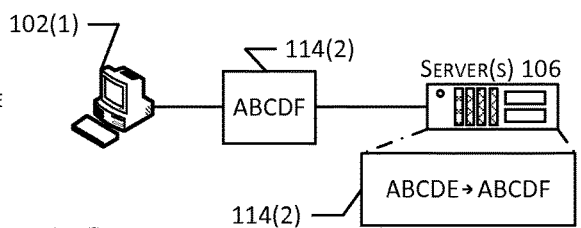 |

FIG. 4

502 RECEIVE REQUESTS FROM MULTIPLE PROCESSES TO ACCESS A SINGLE VALUE ASSOCIATED WITH A VERSION IDENTIFIER

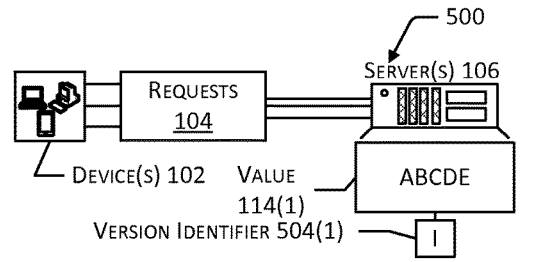

506 DETERMINE AVAILABILITY OF LEASES ASSOCIATED WITH THE VALUE BY DETERMINING WHETHER A COUNT OF PROCESSES ACCESSING THE VALUE EQUALS OR EXCEEDS A MAXIMUM COUNT

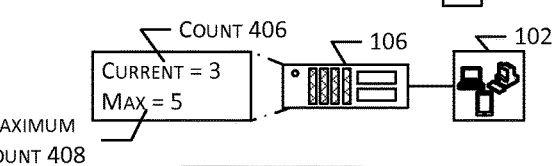

508 GRANT LEASES TO A SUBSET OF THE PROCESSES, THEREBY PROVIDING ACCESS TO THE VALUE TO THE PROCESSES

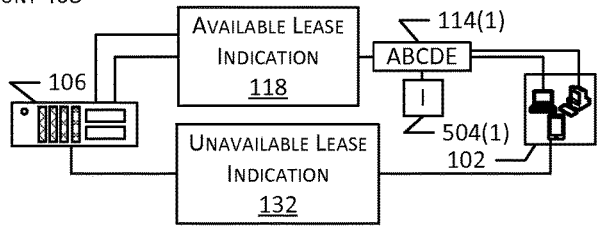

510 RECEIVE A REQUEST FROM ONE OF THE PROCESSES TO MODIFY THE VALUE

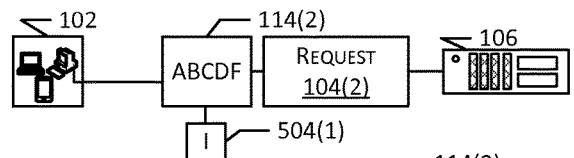

512 DETERMINE CORRESPONDENCE BETWEEN THE VERSION IDENTIFIER OF THE MODIFICATION AND THAT ASSOCIATED WITH THE LEASE, AND MODIFY THE VALUE AND VERSION IDENTIFIER

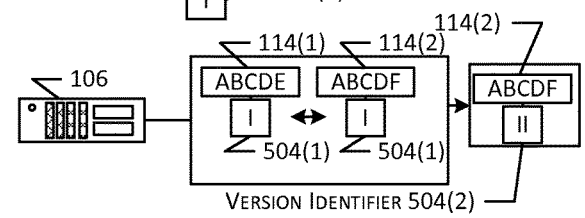

514 RECEIVE A REQUEST FROM ANOTHER OF THE PROCESSES TO MODIFY THE VALUE

516 DETERMINE LACK OF CORRESPONDENCE BETWEEN THE VERSION IDENTIFIER OF THE MODIFICATION AND THAT OF THE VALUE

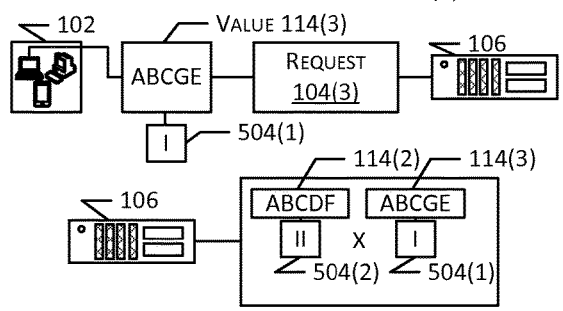
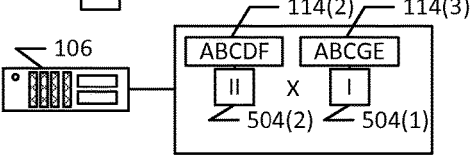

518 PROVIDE THE MODIFIED VERSION OF THE VALUE TO THE OTHER OF THE PROCESSES

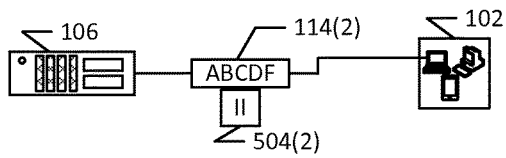

FIG. 5

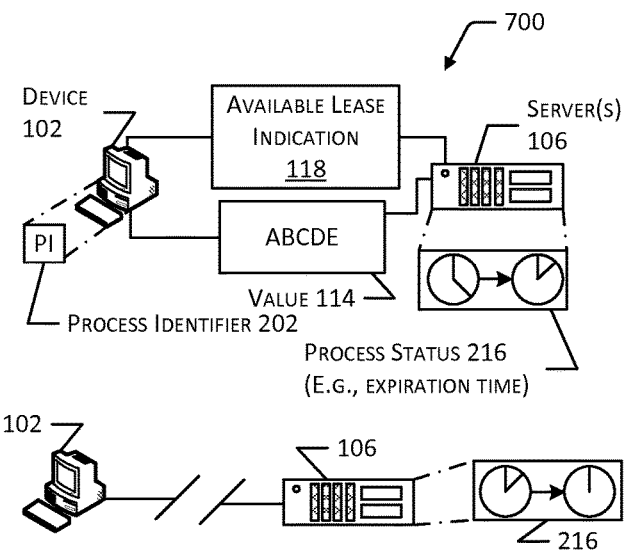

702 — GRANT A LEASE TO A PROCESS, THEREBY PROVIDING ACCESS TO A VALUE TO THE PROCESS AND BEGIN TOLLING AN EXPIRATION TIME ASSOCIATED WITH THE LEASE

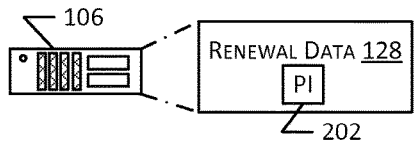

704 — DETERMINE A LAPSE OF THE EXPIRATION TIME AND REVOKE THE LEASE TO THE PROCESS

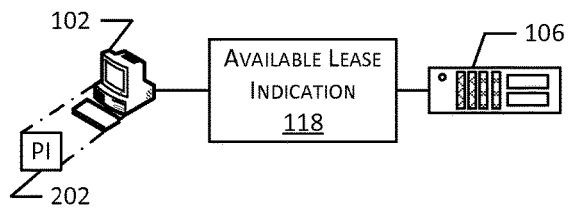

706 — GENERATE RENEWAL DATA INDICATIVE OF THE PROCESS FOR WHICH THE LEASE WAS REVOKED

708 — GRANT A SUBSEQUENT LEASE TO THE PROCESS

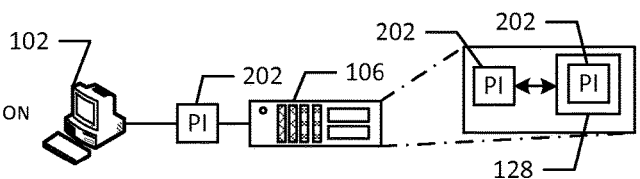

710 — MODIFY THE EXPIRATION TIME ASSOCIATED WITH THE LEASE BASED ON THE RENEWAL DATA

FIG. 7

SYSTEM FOR CONTROLLING ACCESS TO STORED VALUES

BACKGROUND

Access to values and other resources in distributed systems may be controlled through use of resource locks, which restrict the ability of multiple processes to simultaneously access or modify a value at a particular time. For example, multiple simultaneous attempts to change or update a value stored in a database may result in one or more processes acting on a version of the value that has been previously changed or replaced. Pessimistic resource locks ensure that only one process may access a stored value at any given time, but may result in resource starvation as other processes are unable to access the stored value, especially in situations where the process acts slowly or fails without relinquishing the lock. Optimistic resource locks permit multiple processes to access and attempt to modify a stored value, while performing checks to ensure that each received modification is applied to the latest available version of the value. While suitable for use with a small number of processes, use of optimistic locks with large-scale systems is infeasible due to the number of processes attempting to use the same stored value. A system that allows for controlled access to values in a high throughput system is thus desired.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 4 is a scenario for granting leases to one or more processes to access a value and modifying the value based on confirmation of a lease granted to a process.

FIG. 5 is a scenario for granting leases to one or more processes to access a value and modifying the value based on confirmation that a process is acting on the latest version of the value.

FIG. 7 is a scenario for renewing a lease granted to a process based on renewal data indicating previous revocation of a lease to the process due to a lapse in expiration time.

Figure 1:
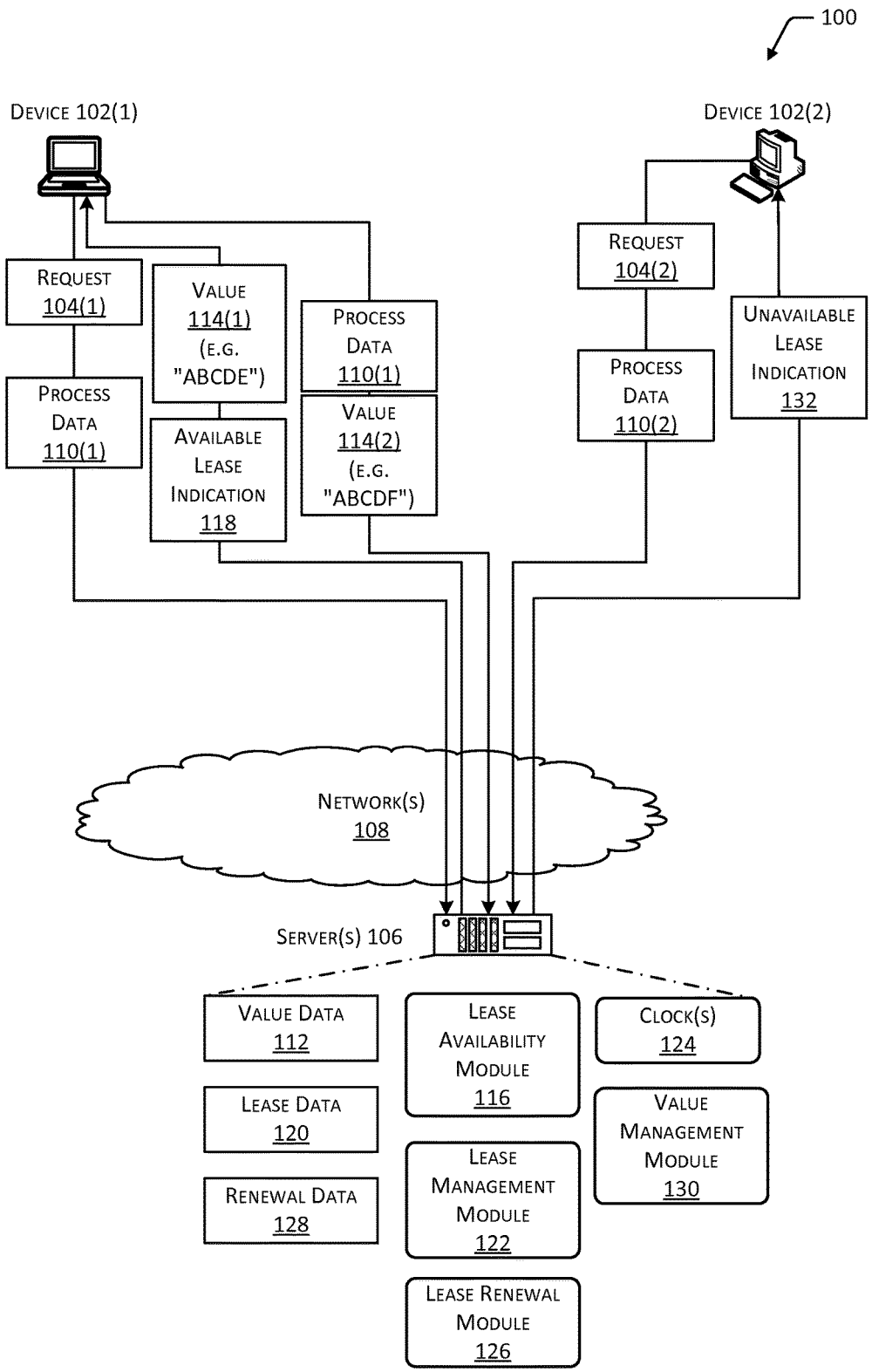
FIG. 1 depicts a system for managing leases to processes accessing one or more values.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Distributed systems typically include a large number of stored values and other resources that may be accessible to multiple processes executing on one or more devices. For example, a product database for a merchant or vendor may contain numerous items, each associated with an identifier (e.g., an alphanumeric string), a category or type, a price, an available quantity, and so forth. At any time, one or more processes may attempt to access or modify one or more of these values. Common difficulties encountered in such systems relate to the simultaneous access of a particular value by multiple processes, and attempts to modify the value by multiple processes. Continuing the example, when one or more items are purchased, a first process associated with the purchase of the items may attempt to update a value corresponding to the available quantity of items. While the first process is updating the value, a second process may attempt to update this value when a stock of items is received. If the second process accesses the value before it is updated by the first process, both processes will attempt to simultaneously modify the value in a different manner. In the absence of a system for controlling access to and modification of values, concurrent actions by different processes may generate erroneous data.

Large-scale systems may use pessimistic locks, which restrict access to a value to a single process at any given time. Pessimistic locks may create latency and decrease throughput of a system by restricting access to a value to a single process. Other processes attempting to access a value may be delayed until the process that has been granted the lock has completed its modification. If the process acts slowly or fails without relinquishing the lock, the delay generated in the system may be significant. Pessimistic locks may also maintain a connection between the process and the lock system. Maintenance of a number of these connections may decrease system throughput by consuming connection resources and preventing the connection from being used for other purposes while the value is accessed by the process.

Smaller-scale systems may use optimistic locks, which permit access to a value by multiple processes, but prevent modification of the value by a process if it is determined that the modification was not performed on the latest version of the value. Optimistic locks are impractical for use with systems where a large number of modifications associated with different versions of a value may occur. Optimistic locks may also maintain connections between processes and the lock system, consuming resources to maintain the connections and preventing use of the connections for other purposes.

This disclosure describes systems, methods, and computer-readable media configured to control access to stored values by one or more processes and control modification of stored values by the processes, while reducing latency, and increasing throughput. In some implementations, the use of connections and connection-based resources may be reduced by permitting processes to act on values in the absence of a connection.

To obtain access to a stored value, a device or service executing a process may establish a data connection with one or more servers or other devices maintaining a lease management module, a data store, and so forth. One or more processes associated with the device(s) may request a lease to access a stored value. A lease may include a contract that gives the holder (e.g., a process) rights to a value or other resource for a particular period of time. For example, a process that has been granted a lease may be permitted to access or modify a value. In some implementations, in contrast to locks, a lease may expire after a period of time.

To determine whether a lease is available to the process, a count of processes currently accessing the stored value and a maximum number of processes permitted to access the value may be determined. If the maximum number of processes exceeds the current count of processes accessing the value, a lease may be available. In some implementations, a value may be restricted to access by only a single process at a particular time, in which case the maximum number of processes permitted to access the value would be one. In other implementations, availability of a lease accessible to a single process may be determined by querying lease data to determine a value identifier associated with the stored value. Determination that value identifier is currently associated with a lease may indicate that a lease is unavailable.

If a lease is not available, the connection with the process may be terminated. In some implementations, a notification that a lease is not available may be provided to the process. In other implementations, when a lease becomes available, a connection may be established with the device implementing the process to grant a lease. In still other implementations, connection with the device to grant a lease may be retried periodically.

In some implementations, subsequent to the granting of a lease to a process, the data connection with the device implementing the process may be terminated such that the connection may be used for other purposes while the process acts on the value. In other implementations, a connection with the device implementing the process may be maintained.

When a lease is granted, lease data indicative of the lease may be generated. For example, a process identifier associated with the process and a value identifier associated with the value may be stored in association with one another. Subsequently, a request from the process to modify the value may be received. Correspondence between the process identifier associated with the requesting process may be determined prior to reestablishing a connection with the process to receive a modification to the value.

A process may modify a value by changing one or more elements thereof, by replacing the value with a different value, by deleting the value, by setting the value to null, and so forth. For example, a modified version of the stored value, or a different value, may be received from the process to replace the stored value. A process may merge a value with other values, or separate a value into multiple values. In such instances, the process may obtain leases for accessing multiple values. In other implementations, a process may obtain access to a value without attempting to modify the value. For example, a user associated with a device implementing the process may desire to view a value without acting on the value. Following completion of the action performed by the process, the lease to the process may be terminated.

In implementations where leases to access a value are granted to multiple processes, a version identifier may be associated with the value. When a process attempts to modify the value, correspondence may be determined between the version identifier associated with the modification and the version identifier associated with the stored value. If correspondence is determined, the value may be modified by the process, and the version identifier may be replaced to indicate a newer version of the value. If an additional process subsequently attempts to modify the value by acting on a preceding version of the value, a lack of correspondence between the version identifier associated with the modification and the version identifier associated with the value may be determined. Responsive to the lack of correspondence, the modified version of the value may be provided to the process. In other implementations, the modification provided by the process may be applied to the modified version of the value.

In some implementations, a lease may have an expiration time associated therewith. For example, if a process fails without relinquishing a lease, lapse of the expiration time may cause automatic revocation of the lease to prevent the failed process from precluding access of a lease, a value, or a connection by other processes. If the action performed by a process may require time in excess of the expiration time, the process may request renewal of the lease (e.g., via modification or renewal of the expiration time). Renewal data that includes one or more process types, user identifiers, device identifiers, or process identifiers may be queried to determine correspondence with the process type, user identifier, device identifier, or process identifier associated with the requesting process. If correspondence is determined, the expiration time associated with the lease may be modified. For example, a process attempting to merge multiple values into a single value may require a lease having a longer expiration time than a process attempting to replace one value with a different value. In such an example, the renewal data may include a process type corresponding to merging of values, and this process type may be determined from a process requesting a lease. Determination of this process type may enable the expiration time for a lease granted to that process to be modified. Modifications of expiration time may include an increase in the expiration time, a decrease in the expiration time, renewal of the expiration time on one or multiple occasions, renewal of the expiration time for a fixed number of occasions, renewal of the expiration time for an unlimited number of occasions, and so forth.

In some implementations, the expiration time associated with a lease granted to a process may lapse in one or more instances. For example, a process may attempt to perform a complex action on a value that may require time in excess of the expiration time. If the process does not request a renewal of the expiration time, or if the renewal data does not include the process type associated with the process, the expiration time may lapse, resulting in revocation of the lease to the process. Upon the lapse of the expiration time and revocation of the lease from the process, the process identifier associated with the process may be stored. When a lease is subsequently granted to that process, the process identifier associated with the process may be determined from the renewal data, and the expiration time associated with the lease may be modified.

Implementations within the scope of the present disclosure may thereby permit access to values by one or more processes while preventing monopolization of values or connections by processes that may have failed. Implementations that permit access to values by multiple processes, while limiting the count of processes, may optimize the accessibility of values while limiting negative impacts to system throughput, combining benefits of both pessimistic and optimistic locks while avoiding drawbacks thereof.

FIG. 1 depicts an implementation of a system 100 for managing leases to processes accessing one or more values. A first device 102(1) is shown providing a request 104(1) for a lease to one or more servers 106 via one or more networks 108. The device 102(1) may also provide process data 110(1) to the server(s) 106, which may include an identifier associated with the device 102(1), with one or more processes implemented by the device 102(1), with one or more users of the device 102(1), and so forth.

Devices 102 may include, without limitation, mobile devices, smartphones, set-top boxes, tablet computers, personal computers, wearable computers, or other types of computing devices. The network(s) 108 may include public networks such as the Internet, private networks such as an institutional or personal intranet, or a combination thereof. The network(s) 108 may include any type of wired or wireless network, including, but not limited to, a personal area network (PAN), local area network (LAN), wide area network (WAN), and so forth. The network(s) 108 may communicate using Ethernet, Wi-Fi™, Bluetooth®, ZigBee®, 3G, 4G, LTE, Z-Wave, or other technologies.

The server(s) 106 may store value data 112, which may include one or more values 114, identifiers associated with the values 114, metadata associated with the values 114, data structures associated with the values 114, and so forth. A value 114 may include any manner of data object, including without limitation, alphanumeric data, audio data, video data, or a combination thereof. In some implementations, a value 114 may include a resource, such as an application, computer-executable instructions, and so forth.

A lease availability module 116 in the server(s) 106 may determine whether a lease to access one or more of the values 114 may be granted to the process associated with the device 102(1), and may provide an available lease indication 118 to the device 102(1) if a lease is available. To determine availability of a lease, the lease availability module 116 may access lease data 120, which may include identifiers corresponding to one or more values 114, stored in association with identifiers corresponding to one or more processes accessing the values 114.

In some implementations, access to a value 114 may be restricted to a single process at a particular time. The lease availability module 116 may access the lease data 120 to determine whether an identifier associated with a process is currently stored in association with an identifier associated with the value 114. If no process is currently accessing the value 114, the available lease indication 118 may be provided and a lease may be granted to the process. In other implementations, a value 114 may be accessed by multiple processes at a particular time, the number of processes being restricted to a maximum number. The lease availability module 116 may access one or more of the value data 112 or the lease data 120 to determine a current number of processes accessing the value 114 and a maximum number of processes permitted to access the value 114. If the current number of processes is less than the maximum number of processes, a lease may be granted to the process.

After a lease has been granted to the process associated with the device 102(1), the process may access the requested value 114. For example, FIG. 1 depicts the device 102(1) receiving a first value 114(1) (e.g., "ABCDE") from the server(s) 106. In some implementations, after a lease has been granted to the process, the connection between the associated device 102(1) and the server(s) 106 may be terminated to enable the connection to be used for other purposes while the process acts on the value 114(1). Termination of the connection in this manner may increase the total throughput of the system 100 in implementations where a number of devices 102 accessible by the system 100 exceeds the number of connections available to the system 100.

A lease management module 122 may generate, edit, and delete lease data 120 and determine a status of one or more leases, values 114, and processes associated therewith. For example, the lease management module 122 may determine an expiration time associated with a lease, and may revoke a lease from a process upon a lapse of the expiration time. One or more clocks 124 may be used to determine the expiration of leases and other system 100 events. Continuing the example, if a process executed by the device 102(1) fails, or if the process does not act on the value 114(1) within the expiration time, the lease granted to the process may be revoked by the lease management module 122, such that the lease is available to other processes.

In some implementations, a process may require time in excess of the expiration time to act on a value 114. The process may submit a request to renew the lease (e.g., via modifying or renewing the expiration time) prior to a lapse of the expiration time. A lease renewal module 126 may process this request. The lease renewal module 126 may determine one or more of a process type, a user identifier, a device identifier, or a process identifier from process data 110 and access renewal data 128 that includes one or more process types, user identifiers, device identifiers, or process identifiers. If correspondence between the process data 110 and the renewal data 128 is determined, the lease renewal module 126 may modify the expiration time. In some implementations, the renewal data 128 may be configured to permit renewal of leases for selected process types, processes, users, or devices. In other implementations, the renewal data 128 may include identifiers associated with a process or device, or a process type, for which the expiration time has lapsed previously. For example, if a process fails to act on a value 114 within the expiration time on one or more occasions, an identifier associated with the process may be stored as renewal data 128. On a subsequent occasion, the expiration time associated with a lease granted to that process may be modified.

In the depicted implementation, the process associated with the device 102(1) may modify the first value 114(1) to generate a second value 114(2) (e.g., "ABCDF"). In other implementations, the process may delete the value 114(1), set the value 114(1) to null, merge the value 114(1) with one or more other values 114, separate the value 114(1) into multiple other values 114, replace the value 114(1) with a different value 114, and so forth. One or more modifications to the value 114(1) or modified versions of the value 114(1), such as the second value 114(2), may be provided to the server(s) 106. Process data 110(1) associated with the process implemented by the device 102(1) may also be provided by the device 102(1) or determined from the device 102(1) by the server(s) 106.

The lease management module 122 may determine correspondence between at least a portion of the process data 110(1) associated with the second value 114(2) (e.g., an identifier associated with the process) and the identifier of the process stored as lease data 120. Upon a determination of correspondence, the server(s) 106 may reestablish a connection with the device 102(1) to receive the second value 114(2). A value management module 130 may receive the second value 114(2) and modify the first value 114(1) using the second value 114(2), such as by replacing the first value 114(1) with the second value 114(2).

FIG. 1 depicts a second device 102(2) providing a request 104(2) to access a value 114. The device 102(2) is also shown providing process data 110(2) associated with a process implemented by the device 102(2). In the depicted implementation, a lease is not available to grant to the second device 102(2). For example, the lease availability module 116 may determine that due to one or more processes currently accessing the value 114, such as the process associated with the first device 102(1), no additional processes may be granted a lease to access the value 114. An unavailable lease indication 132 may be provided to the second device 102(2). In some implementations, the connection between the second device 102(2) and the server(s) 106 may be terminated. The connection with the device 102(2) may be reestablished when a lease become available. In other implementations, one or more of the device 102(2) or the server(s) 106 may periodically attempt to determine whether a lease is available.

In some implementations, one or more of the lease availability module 116, the lease management module 122, the lease renewal module 126, the value management module 130, the value data 112, the lease data 120, or the renewal data 128 may be implemented as a library, accessible to one or more devices 102 or servers 106. Use of a library may allow existing devices 102 to utilize the functionality provided by one or more of the modules by accessing the library.

Figure 2:
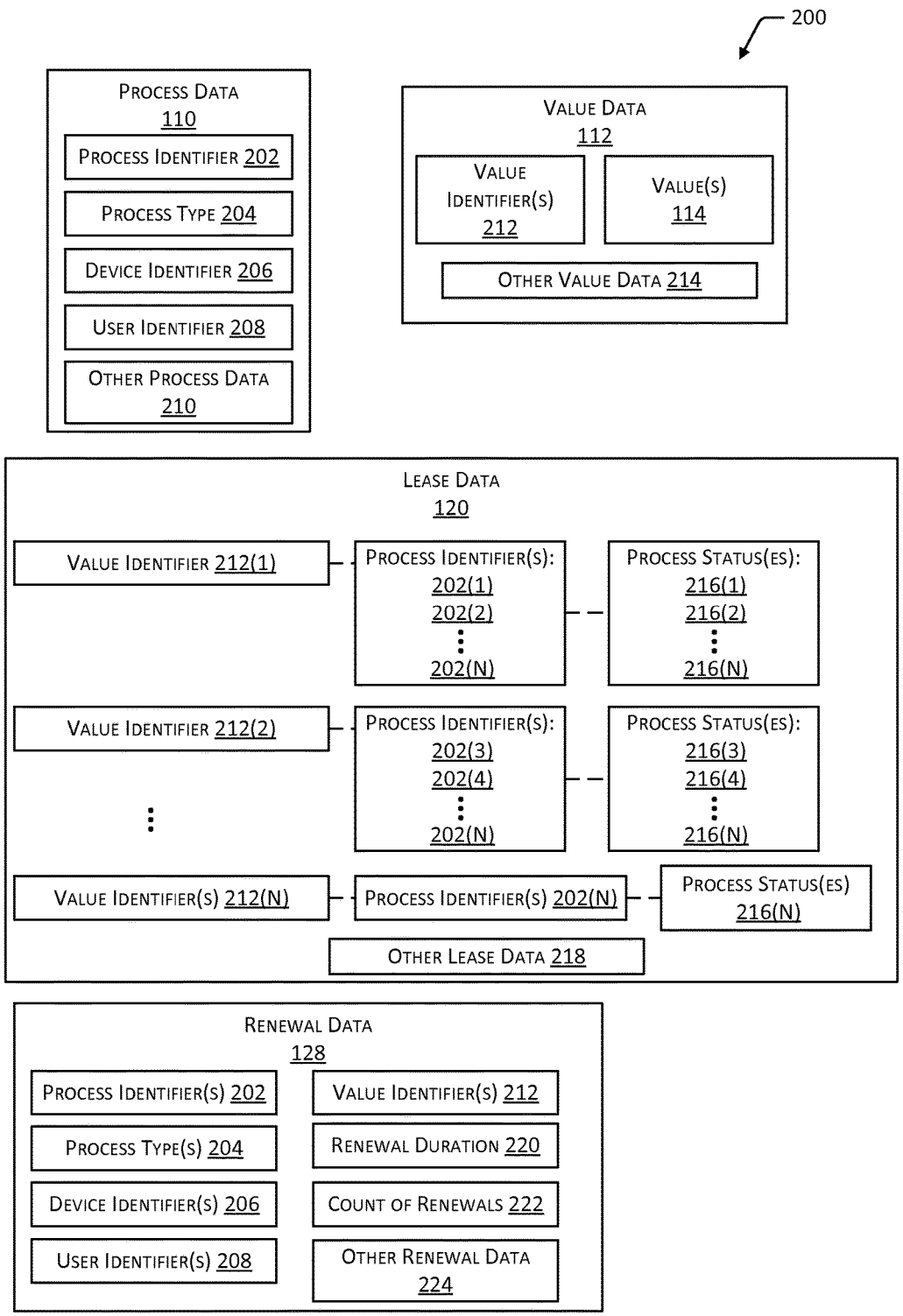
FIG. 2 is a block diagram illustrating examples of value data, process data, lease data, and renewal data that may be used to grant and revoke leases and provide access to and modify values.

FIG. 2 is a block diagram 200 illustrating example implementations of the process data 110, value data 112, lease data 120, and renewal data 128, that may be used with the system 100 shown in FIG. 1. The process data 110 may include data that identifies a process implemented by one or more devices 102, the devices 102 themselves, one or more users associated with the devices 102, a type or functions of a process, and so forth. For example, FIG. 2 depicts the process data 110 including a process identifier 202. Process identifiers 202 may include any manner of data, such as an alphanumeric string (e.g., a name) or image, that may be used to differentiate one process from other processes to facilitate identification thereof. In some implementations, a process identifier 202 may include an identifier recognizable by a computing device that is not necessarily recognizable by a user. Process identifiers 202 may, for example, be stored as lease data 120 in association with identifiers of values 114 to which the process has been granted access via a lease. In some implementations, process identifiers 202 may be stored as renewal data 128. For example, specific processes may be eligible for renewal of a lease, modification of expiration time, and so forth, based on the identity thereof, independent of other data associated with the process.

The process data 110 may include a process type 204. Process types 204 may include one or more functions or categories of functions performed by a process when acting on a value 114. For example, a process may update a value 114 (e.g., by modifying or replacing the value 114), merge the value 114 with one or more other values 114, unmerge the value 114 to produce multiple individual values 114, remap the value 114, delete the value 114, and so forth. In some implementations, correspondence between the process type 204 of the process data 110 and one or more process types 204 in the renewal data 128 may be used to determine whether a process is eligible for renewal of a lease. For example, merging of a value 114 with other values 114 may require more time to complete than updating a value 114. A lease granted to processes having a process type 204 indicative of merging of values 114 may thereby be renewed automatically or upon receipt of a request. In some implementations, a lease granted to a process having a process type 204 that corresponds to the renewal data 128 may have a longer expiration time associated therewith, or use of an expiration time may be omitted.

The process data 110 may also include a device identifier 206. Device identifiers 206 may include any manner of name (e.g., an alphanumeric string or image), address (e.g., Machine Access Control (MAC) address or Internet Protocol (IP) address), or other identifier that may be used to differentiate one device 102 from other devices 102. In some implementations, the device identifier(s) 206 may include a session identifier corresponding to a communication session between the device 102 and the server(s) 106 or other computing devices. In some implementations, a device identifier 102 may include an identifier recognizable by a computing device that is not necessarily recognizable by a user. Device identifiers 206 may be stored as renewal data 128. For example, specific devices 102 may be eligible for renewal of a lease, modification of expiration time, and so forth, based on the identity thereof, independent of other data associated with the device 102. In other implementations, one or more device identifiers 206 may be stored as lease data 120 and used to determine correspondence with device identifiers 206 associated with requests 104 and with values 114 received from devices 102.

The process data 110 may further include a user identifier 208. User identifiers 208 may include any manner of name or other data (e.g., alphanumeric, image, video, audio) associated with a user of a device 102. User identifiers 208 may be used to differentiate one device 102 from other devices 102. In some implementations, user identifiers 208 may be associated with multiple devices 102. A user identifier 208 may include an identifier recognizable by a computing device that is not necessarily recognizable by a user. User identifiers 208 may be stored as renewal data 128. For example, specific users may be eligible for renewal of a lease, modification of expiration time, and so forth, based on the identity of the user, independent of other data associated with the user. In other implementations, one or more user identifiers may be stored as lease data 120 and used to determine correspondence with user identifiers 208 associated with requests 104 and with values 114 received from devices 102.

Other process data 210 may include data specific to the functions performed by a process on a value 114, types of values 114 eligible or ineligible to be acted on by a process, indications of other programs or information implemented by a device 102 and so forth.

The value data 112 may include value identifiers 212, which may correspond to one or more values 114. The value identifiers 212 may include any manner of name (e.g., an alphanumeric string or image), a type or category, or other identifier that may be used to differentiate one value 114 from other values 114. In some implementations, a value identifier 212 may include an identifier recognizable by a computing device that is not necessarily recognizable by a user.

The value data 112 may also include one or more values 114 stored in association with the value identifiers 212. Values 114 may include any manner of data, including without limitation, alphanumeric data, audio data, video data, or a combination thereof. For example, a value 114 may include a number or alphanumeric string corresponding to an item available for purchase, an identifier of the item, a quantity of items, a type or category of items, a price of an item, a manufacturer, user, or vendor associated with an item, and so forth. Continuing the example, processes may act on values 114 by modifying the number or alphanumeric string, increasing or decreasing the quantity, modifying the type or category, merging the value 114 with other values 114 having a similar type or category, and so forth.

Other value data 214 may include flags or indexing data to facilitate the location of the value data 112, identifiers of one or more related values 114 for which modification may be desired if the value 114 is modified, and so forth.

The lease data 120 may include data corresponding to leases granted to one or more processes. For example, the lease data 120 is shown including a plurality of value identifiers 212, one or more of which may correspond to a value 114. The depicted value identifiers 212 are stored in association with process identifiers 202. Process identifiers 202 stored in association with a value identifier 212 may correspond to processes currently granted a lease to access the associated value 114. One or more of the process identifiers 202 may be stored in association with one or more process statuses 216, representing the current status of the process. For example, a process status 216 may indicate that a process has requested a lease, that a process has been granted a lease, that a lease to a process has been revoked, that a process has requested to modify a value 114, that a process has requested renewal of a lease, and so forth. In some implementations, the process status 216 may include an expiration time, such as an amount of time remaining before a lease granted to the process will be revoked. Process statuses 216 may further include an indication of whether a process has indicated activity or failure.

For example, FIG. 2 depicts a first value identifier 212(1) stored in association with a plurality of process identifiers 202. Continuing the example, processes associated with a first process identifier 202(1) and a second process identifier 202(2), stored in association with the first value identifier 212(1) have been granted a lease to access the value 114 corresponding to the first value identifier 212(1). Similarly, other process identifiers 202(N) may be granted a lease to access the value 114 corresponding to the first value identifier 212(1). A first process status 216(1) may correspond to a status of the process associated with the first process identifier 202(1), and a second process status 216(2) may correspond to a status of the process associated with the second process identifier 202(2). Similarly, other process statuses 216(N) may correspond to the status of other processes.

A second value identifier 212(2) is shown stored in association with a third process identifier 202(3), a fourth process identifier 202(4), and other process identifiers 202 (N). A third process status 216(3) may correspond to a status of the process associated with the third process identifier 202(3), and a fourth process status 216(4) may correspond to a status of the process associated with the fourth process identifier 202(4). Similarly, other process statuses 216(N) may correspond to the status of other processes.

One or more additional value identifiers 212(N) may similarly be stored in association with other process identifiers 202(N) and other process statuses 216(N). In some implementations, a single process may be granted a lease to access multiple values 114. In other implementations, a process may only access a single value 114 at a particular time.

Other lease data 218 may include maximum counts of processes permitted to obtain leases to access one or more values 114, specific values 114 for which leases may be granted to specific processes or types of processes independent of a maximum number of permitted processes, specific values 114 for which leases may not be granted to specific processes or types of processes, and so forth.

The renewal data 128 may include data usable to determine whether to renew a lease granted to a process or modify an expiration time associated with the lease, either automatically or upon receiving a request from a process. For example, the renewal data 128 may include one or more process identifiers 202. Specific processes, which may be identified by receiving a process identifier 202 associated therewith, may be provided with a renewed lease when correspondence between the process identifier 202 associated with the process and the process identifier 202 of the renewal data 128 is determined. Continuing the example, a specific process may be associated with an administrator of the system 100, or associated with certain devices 102, values 114, users, process types 204, and so forth, for which interruption of a lease granted to the process may be undesirable. The renewal data 128 may include process identifiers 202 associated with such processes such that the leases granted to the processes may be renewed, automatically or upon receiving a request from a process, due to the identity of the process, determined by a process identifier 202 received therefrom.

The renewal data 128 may include one or more process types 204. For example, a process type 204 corresponding to a process may be determined from process data 110 associated with the process. Process types 204 may include one or more functions or categories of functions performed by a process when acting on a value 114. The process type 204 may determine whether a lease granted to a process may be renewed. For example, a process attempting to merge a value 114 with other values 114 may require more time to complete this action than a process attempting to update or replace a value 114. The renewal data 128 may include a process type 204 corresponding to merging of values 114, such that a lease granted to processes having a process type 204 indicative of merging of values 114 may be renewed automatically or upon receipt of a request for renewal.

The renewal data 128 may include one or more device identifiers 206. Device identifiers 206 may be determined from process data 110 associated with a process requesting a lease, or from devices 102 implementing one or more processes. In some implementations, a device identifier 206 may include a session identifier corresponding to a communication session between the device 102 and the server(s) 106 or other computing devices. For example, specific devices 102 may be eligible for renewal of a lease, modification of expiration time, and so forth, based on the identity thereof, independent of other data associated with the device 102. Devices 102 may be associated with an administrator of the system 100, or with one or more processes for which interruption of a lease granted thereto may be undesirable. The renewal data 128 may include device identifiers 206 associated with such devices 102, such that the leases granted to processes implemented by the devices 102 may be renewed, automatically or upon receiving a request from a process, due to the identity of the device 102.

The renewal data 128 may further include one or more user identifiers 208 associated with users or user accounts. A user identifier 208 may be determined, for example, from a user account associated with a user accessing a device 102. For example, specific users may be eligible for renewal of a lease, modification of expiration time, and so forth, based on the identity of the user, independent of the device 102 accessed by the user, the process implemented by the user, or other data associated with the user. A user may be an administrator of the system 100 or an agent thereof, or associated with one or more processes for which interruption of a lease granted thereto may be undesirable. The renewal data 128 may include user identifiers 208 associated with users or user accounts, such that the leases granted to processes implemented by the user associated with a user identifier 208 may be renewed, automatically or upon receiving a request from a process.

The renewal data 128 may also include one or more value identifiers 212. In some implementations, a lease granting access to certain values 114 may be eligible for renewal independent of the identity or type of process to which the lease was granted. For example, one or more values 114 may be a type or category of value 114 that requires time in excess of an expiration time to act upon or modify. One or more values 114 may be of significant importance to operation of the system 100, such that interruption of a lease granting access to the value(s) 114 is undesirable. One or more values 114 may be of low importance, such that consumption of a lease granting access thereto by a slow or failed process is a more desirable outcome than the consumption of system resources determining expiration or renewal of the lease. Leases granted to processes to access such values 114 may be renewed automatically, or upon receiving a request 104 from a process.

The renewal data 128 may include a renewal duration 220. One or more leases may have an expiration time associated therewith, each expiration time having a duration. When a lease is renewed, the renewal of the lease may have a renewal duration 220 associated therewith. The renewal duration 220 may be equal to the initial value of the expiration time, or a different duration. In some implementations, the renewal duration 220 may depend on a process identifier 202 or process type 204 of a process requesting a lease, a device identifier 206 or user identifier 208 associated with a process, a value identifier 212 of a value 114 associated with the lease, and so forth. For example, renewal of a lease associated with a specific value 114 may have a certain renewal duration 220 associated therewith. Renewal of a lease associated with a different value 114 may have a different renewal duration 220.

The renewal data 128 may include a count of renewals 222. In some implementations, the number of instances a lease may be renewed may be limited. For example, one or more leases may be renewed a single time, while subsequent requests to renew the leases may be declined. Continuing the example, after renewal of a lease, the count of renewals 222 for that lease may be increased. Upon receipt of a subsequent request for renewal of the lease, the count of renewals 222 may be queried, and if the count of renewals 222 equals or exceeds a maximum number of renewals permitted for the lease, the request for renewal may be declined.

Other renewal data 224 may include a maximum number of renewals associated with one or more leases or one or more process identifiers 202, device identifiers 206, user identifiers 208, value identifiers 212, and so forth that are ineligible for renewal independent of other data.

Figure 3:
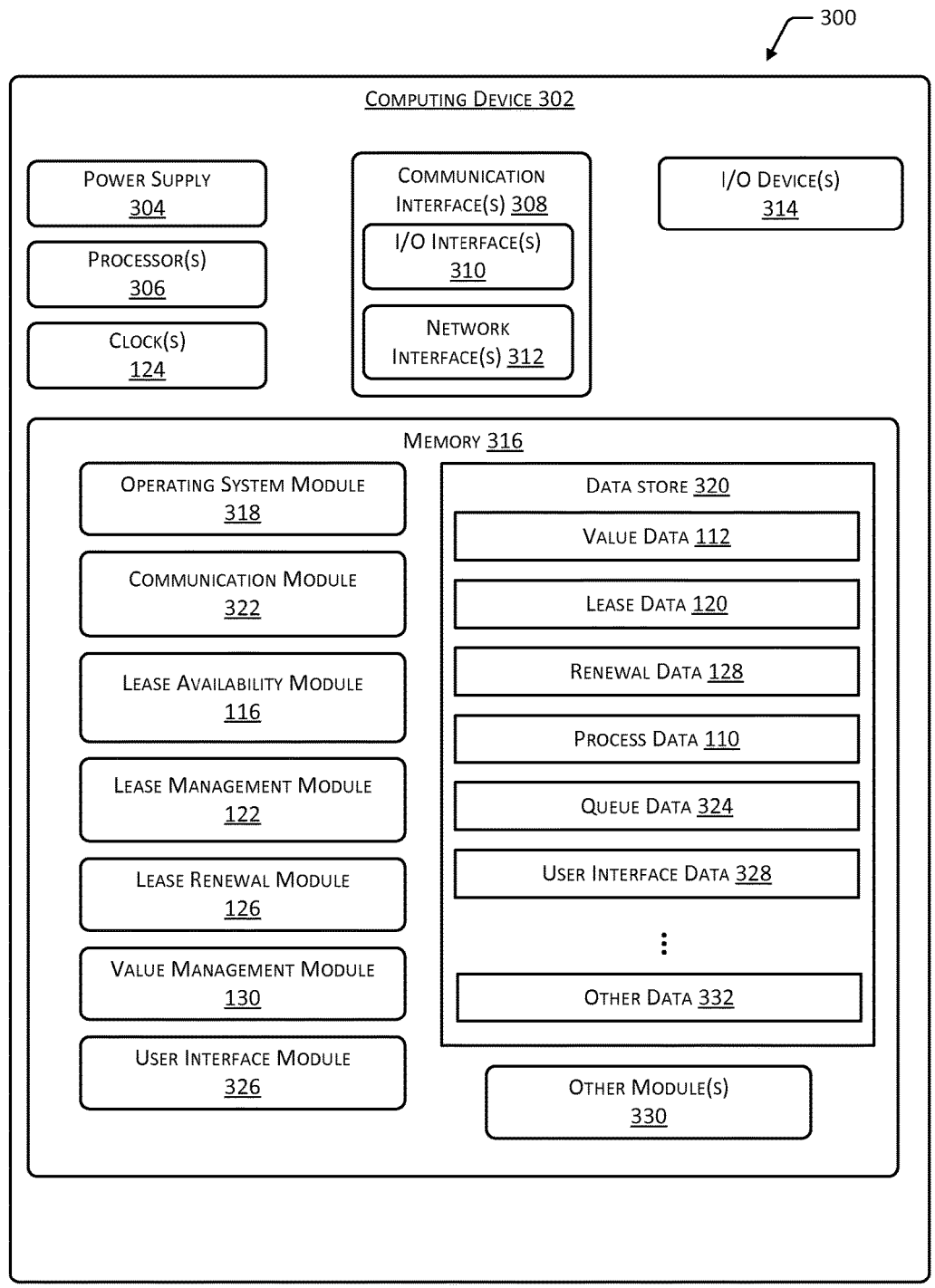
FIG. 3 is a block diagram illustrating a computing device within the scope of the present disclosure.

FIG. 3 illustrates a block diagram 300 of a computing device 302 configured to support operation of the system 100. The computing device 302 may include one or more devices 102, servers 106, other computing devices 302, or computer readable storage media (CRSM) or libraries accessible to the devices 102, servers 106, or other computing devices 302.

One or more power supplies 304 may be configured to provide electrical power suitable for operating the components in the computing device 302. In some implementations, the power supply 304 may include a rechargeable battery, fuel cell, photovoltaic cell, power conditioning circuitry, and so forth.

The computing device 302 may include one or more hardware processor(s) 306 (processors) configured to execute one or more stored instructions. The processor(s) 306 may include one or more cores. One or more clocks 124 may provide information indicative of date, time, ticks, and so forth. For example, the processor(s) 306 may use data from the clock 124 to generate a timestamp, trigger a preprogrammed action, and so forth. As described previously, one or more clocks 124 may be used to determine the expiration of leases and other system 100 events. For example, if a process executed on a value 114 fails or is not completed within an expiration time, as determined by the clock 124, the lease granted to the process may be revoked.

The computing device 302 may include one or more communication interfaces 308, such as input/output (I/O) interfaces 310, network interfaces 312, and so forth. The communication interfaces 308 may enable the computing device 302, or components thereof, to communicate with other devices or components. The I/O interfaces 310 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 310 may couple to one or more I/O devices 314. The I/O devices 314 may include any manner of input device or output device associated with a device 102, server 106, or other computing device 302. For example, I/O devices 314 may include touch sensors, buttons, keyboards, mice, cameras, microphones, scanners, displays, speakers, haptic devices, printers, and so forth. In some implementations, the I/O devices 314 may be physically incorporated with the computing device 302 or may be externally placed.

The network interfaces 312 may be configured to provide communications between the computing device 302 and other devices, such as the I/O devices 314, routers, access points, and so forth. The network interfaces 312 may include devices configured to couple to one or more networks including LANs, wireless LANs, WANs, wireless WANs, and so forth. For example, the network interfaces 312 may include devices compatible with Ethernet, Wi-Fi™, Bluetooth®, ZigBee®, Z-Wave, 3G, 4G, LTE, and so forth.

The computing device 302 may include one or more busses or other internal communications hardware or software that allows for the transfer of data between the various modules and components of the computing device 302.

As shown in FIG. 3, the computing device 302 may include one or more memories 316. The memory 316 may include one or more computer readable storage media (CRSM). The CRSM may be any one or more of an electronic storage medium, a magnetic storage medium, an optical storage medium, a quantum storage medium, a mechanical computer storage medium, and so forth. The memory 316 may provide storage of computer-readable instructions, data structures, program modules, and other data for the operation of the computing device 302. A few example modules are shown stored in the memory 316, although the same functionality may alternatively be implemented in hardware, firmware, or as a system on a chip (SoC).

The memory 316 may include one or more operating system (OS) modules 318. The OS module 318 may be configured to manage hardware resource devices such as the I/O interfaces 310, the network interfaces 312, the I/O devices 314, and to provide various services to applications or modules executing on the processors 306. The OS module 318 may implement a variant of the FreeBSD™ operating system as promulgated by the FreeBSD Project; UNIX™ or a UNIX-like operating system; a variation of the Linux™ operating system as promulgated by Linus Torvalds; the Windows® operating system from Microsoft Corporation of Redmond, Wash., USA; or other operating systems.

A data store 320 and one or more of the following modules may also be stored in the memory 316. The modules may be executed as foreground applications, background tasks, daemons, and so forth. The data store 320 may use a flat file, database, linked list, tree, executable code, script, or other data structure to store information. In some implementations, the data store 320 or a portion of the data store 320 may be distributed across one or more other devices including the computing devices 302, network attached storage devices, and so forth.

A communication module 322 may be configured to establish communications with one or more other computing devices 302, such as devices 102, servers 106, remote CRSM, and so forth. The communications may be authenticated, encrypted, and so forth.

The memory 316 may also store the lease availability module 116. The lease availability module 116 may be configured to receive requests 104 from one or more processes and access lease data 120 to determine the availability of a requested lease. For example, the lease data 120 may include one or more value identifiers 212 associated with one or more values 114, stored in association with process identifiers 202 of processes currently accessing the values 114. The lease availability module 116 may determine a number of leases to access a value 114 that have been previously granted, a number of leases that have been relinquished or revoked, and whether the number of leases that are currently active is less than a maximum number of leases that may be granted to access the value 114. For example, the lease availability module 116 may determine a current number of processes accessing a value 114 for which a lease has been requested equals or exceeds a maximum number of processes permitted to access the value 114. The maximum number of processes permitted to access a value 114 may be stored as value data 112. In some implementations, a maximum number of processes permitted to access a value 114 may be determined by a type or category associated with the value 114.

In some implementations, upon receipt of a request 104 for a lease that is not available, the lease availability module 116 may generate queue data 324. Queue data 324 may include process identifiers 202 associated with one or more process that have requested a lease to access one or more values 114 at a time when a lease was not available. Processes having process identifiers 202 stored as queue data 324 may be permitted to periodically reestablish a connection with the computing device 302 to request 104 a lease. In some implementations, the computing device 302 may periodically attempt to reestablish a connection with the processes. In other implementations, the computing device 302 may attempt to reestablish a connection with one or more of the processes when a lease for accessing the requested value 114 becomes available. In still other implementations, processes having process identifiers 202 stored as queue data 324 may be granted a lease to access a value 114 prior to granting leases responsive to requests received from processes not associated with the queue data 324. The queue data 324 may include any manner of data structure, such as look-up tables, link lists, maps, and so forth. A device implementing a process having an identifier stored as queue data 324 may be configured to periodically reestablish a connection to request a lease. In other implementations, a server 106 or other computing device 302 associated with the lease management module 122 may periodically reestablish connections with devices to attempt to grant leases.

The memory 316 may further store the lease management module 122. The lease management module 122 may generate or edit lease data 120 responsive to receipt of requests 104 to access one or more values 114. The lease management module 122 may delete lease data 120, such as upon relinquishing of a lease by a process or revocation of a lease upon a lapse of an expiration time associated therewith. The lease management module 122 may determine a status of one or more leases, values 114, or processes, such as by accessing value data 112, lease data 120, renewal data 130, process data 110, and so forth. In some implementations, the lease management module 122 may generate output indicative of at least a portion of the lease data 120. For example, a user accessing the system 100 may be provided with output indicating one or more of the identity of one or more values 114 for which a lease has been granted, the identity of one or more processes accessing the values 114, the status of the one or more processes, or a length of time remaining before the lease expires.

The memory 316 may also store the lease renewal module 126. The lease renewal module 126 may determine one or more process types 204, user identifiers 208, device identifiers 206, process identifiers 202, or value identifiers 212 from value data 112, process data 110, lease data 120 and so forth. The lease renewal module 126 may access renewal data 128 that includes one or more process types 204, user identifiers 208, device identifiers 206, process identifiers 202, or value identifiers 212 to determine correspondence between the renewal data 128 and one or more of the process data 110, value data 112, or lease data 120. If correspondence is determined, the lease renewal module 126 may modify the expiration time associated with a lease. In some implementations, the lease renewal module 126 may be configured to receive requests 104 from one or more processes to modify expiration time associated with a lease. In other implementations, the lease renewal module 126 may be configured to automatically renew a lease prior to lapse of the expiration time if correspondence with the renewal data 128 is determined. In some implementations, the renewal data 128 may include identifiers associated with a process or device, or a process type, for which the expiration time has lapsed previously. The lease renewal module 126 may be configured to modify the expiration time associated with a subsequent lease granted to such a process.

The memory 316 is also depicted having the value management module 130 stored therein. The value management module 130 may be configured to store the value data 112 and to receive and process modifications to the values 114 or value identifiers 212. In some implementations, the value management module 130 may include one or more constraints regarding modifications to one or more values 114. For example, one or more values 114 may be limited to specific types of data (e.g., alphanumeric text, video data, audio data, etc.) Continuing the example, one or more numeric values 114 may be limited to integers, positive numbers, and so forth.

The memory 316 may also store a user interface module 326. The user interface module 326 may be configured to provide one or more interfaces by which a user or process may interact with a device 102, server 106, other computing device 302, and so forth. For example, the user interface module 326 may provide an interface to a computing device 302 displaying output indicating one or more of the identity of one or more values 114 for which a lease has been granted, the identity of one or more processes accessing the values 114, the status of the one or more processes, or a length of time remaining before the lease expires. The user interface module 326 may provide one or more interfaces by which a user or process may request leases, provide modifications to values 114, and so forth. Data received from a user or process or output to a user or process may be stored as user interface data 328.

Other modules 330 may also be present in the memory 316. For example, encryption modules may be used to encrypt and decrypt communications between computing devices 302. Output generation modules may be used to provide portions of value data 112, lease data 120, renewal data 128, process data, 110, queue data 324, or user interface data 328 to users. Other data 332 may include system configurations or preferences, such as maximum counts of leases to be granted for certain types or categories of values 114, processes, devices, or users, constraints regarding process identifiers 202 or process types 204 permitted to access one or more values 114 or types of values, and so forth.

In different implementations, different computing devices 302 may have different capabilities or capacities. For example, the server(s) 106 may have significantly more processor 306 capability and memory 316 capacity compared to the devices 102.

FIG. 4 depicts a scenario 400 in which a lease is granted to a process to access and modify a value 114. At 402, a device 102(1) implementing a process may establish a connection with one or more servers 106 by which the process may provide a request 104(1) for a lease to the server(s) 106 to access a value 114(1) stored thereon. For example, a process implemented by the device 102(1) may be configured to act on the value 114(1) to modify, update, or replace the value 114(1). The value 114(1) is depicted as an example alphanumeric string, "ABCDE."

At 404, availability of a lease associated with the value 114(1) may be determined by determining whether a count 406 of processes accessing the value 114(1) currently exceeds a maximum count 408 of processes permitted to access the value 114(1). For example, FIG. 4 depicts a plurality of devices 102(2) executing processes accessing the server(s) 106. The count 406 of current processes accessing the value 114(1) is depicted as "3." The maximum count 408 of processes permitted to access the value 114(1) is depicted as "5." Responsive to the determination that the count 406 of processes currently accessing the value 114(1) is less than the maximum count 408, a lease may be granted to the process responsive to the request 104(1).

At 410, a lease is granted to the process, the lease permitting access by the process to the value 114(1). FIG. 4 depicts the server(s) 106 providing an available lease indication 118 and access to the value 114(1) to the device 102(1), such that the process may act on the value 114(1).

At 412, lease data 120 may be generated, using a process identifier 202 associated with the process and a value identifier 212 associated with the value 114(1). The connection between the device 102(1) and the server(s) 106 may be terminated. As described previously, lease data 120 may include process identifiers 202 associated with one or more processes stored in association with value identifiers 212 associated with one or more values 114. Termination of the connection between the device 102(1) and the server(s) 106 may enable the connection to be used for other purposes while the process implemented by the device 102(1) may act on the value 114(1). In other implementations, a connection between the device 102(1) and the server(s) 106 may be maintained while the process acts on the value 114(1).

At 414, a request 104(2) is received, by the server(s) 106, from the process implemented by the device 102(1) to modify the value 114(1). For example, the device 102(1) is depicted having a second value 114(2) associated therewith, to replace, update, or modify the first value 114(1). The second value 114(2) is depicted as an example alphanumeric string "ABCDF."

At 416, correspondence between the process identifier 202 associated with the process implemented by the device 102(1) and the process identifier 202 associated with the lease data 120 may be determined. For example, a process identifier 202 determined from the device 102(1) may be compared with the process identifier 202 stored in association with the value identifier 212 associated with the value 114(1) are identical. This determination may be indicative that the process was previously granted a lease to access the value 114(1).

At 418, a connection may be reestablished with the device 102(1), and the modification to the value 114(1) (e.g., the second value 114(2)) may be received by the server(s) 106. For example, FIG. 4 depicts the server(s) updating, modifying, or replacing first value 114(1) using the second value 114(2).

FIG. 5 depicts a scenario 500 in which leases are granted to one or more processes implemented by devices 102 to access a value 114(1), and modifications to the value 114(1) are permitted or prevented based on whether it is determined that a process is acting on the latest version of the value 114(1). At 502, requests 104 are received from a plurality of processes executed by one or more devices 102 to access a single value 114(1) associated with a version identifier 504(1). For example, FIG. 5 depicts three devices 102 executing processes, each providing a request 104 to one or more servers 106 storing a first value 114(1). The first value 114(1) is depicted as an example alphanumeric string "ABCDE."

At 506, availability of leases associated with the value 114(1) is determined by a count 406 of processes accessing the value 114(1) currently and a maximum count 408 of processes permitted to access the value 114(1). If the count 406 of processes is less than or equal to the maximum count 408, a lease may be determined to be available. In the depicted scenario 500, the current count 406 of processes is indicated as "3," while the maximum count 408 of processes is indicated as "5." As such, two additional leases to access the value 114(1) may be available.

At 508, leases are granted to a subset of the processes, thereby providing access to the value 114(1) to the subset of the processes. In the depicted scenario 500, an available lease indication 118 and access to the value 114(1) are provided to two of the processes. An unavailable lease indication 132 is provided to a third process.

At 510, a request 104(2) to modify the value 114(1) is received from one of the processes. Specifically, a second value 114(2), depicted as an example alphanumeric string "ABCDF," is depicted being provided from one of the processes to the server(s) 106. The second value 114(2) is shown having the version identifier 504(1) associated therewith. In some implementations, the second value 114(2) may be generated by modifying the first value 114(1). In other implementations, the second value 114(2) may include a newly generated value 114, with which the version identifier 504(1) received by the process may be associated prior to providing the value 114(2) to the server(s) 106.

At 512, correspondence between the version identifier 504(1) associated with the modification (e.g., the second value 114(2)) and the version identifier 504(1) associated with the lease (e.g., the first value 114(1)) may be determined. The first value 114(1) may be modified using the second value 114(2). For example, the first value 114(1) may be updated, replaced, and so forth. The version identifier 504(1) may also be modified, e.g., to indicate that the first version of the value 114(1) has been replaced by a newer version of the value 114(2). Specifically, FIG. 5 depicts the second value 114(2) associated with a second version identifier 504(2).

At 514, a request 104(3) from another of the processes to modify the value 114(1) may be received. For example, one of the processes is depicted providing a third value 114(3), depicted as an example alphanumeric string "ABCGE," to the server(s) 106. The third value 114(3) is shown having the first version identifier 504(1) associated therewith due to the fact that the third value 114(3) was generated by a process after the process received access to the first value 114(1), but before the second value 114(2) was used to modify the first value 114(1). As such, the process generating the third value 114(3) is acting upon a version of the value 114 that was replaced or updated.

At 516, a lack of correspondence between the version identifier 504(2) associated with the second value 114(2) stored in the server(s) 106 and the version identifier 504(1) associated with the modification (e.g., the third value 114(3) received from the process) may be determined. Responsive to the lack of correspondence, at 518, the modified version of the value 114(2) and the second version identifier 504(2) may be provided to the process from which the third value 114(3) was received, to enable the process to act on the latest version of the value 114(2). In other implementations, the process providing the modified value 114(3) receive an error or other indication that the attempted modification of the value 114(2) was unsuccessful. The error may be provided due to the fact that application of the modified value 114(3) was attempted by a process accessing the first value 114(1), rather than the most recent version of the value 114(2). Responsive to receipt of an error or other indication, the process may subsequently attempt to modify the value 114(2), such as by requesting a subsequent lease to access the value 114(2) and provide a modification thereto. In some implementations, a modification to a value 114 may be made to the value 114 independent of the version identifiers 504 associated therewith.

Figure 6:
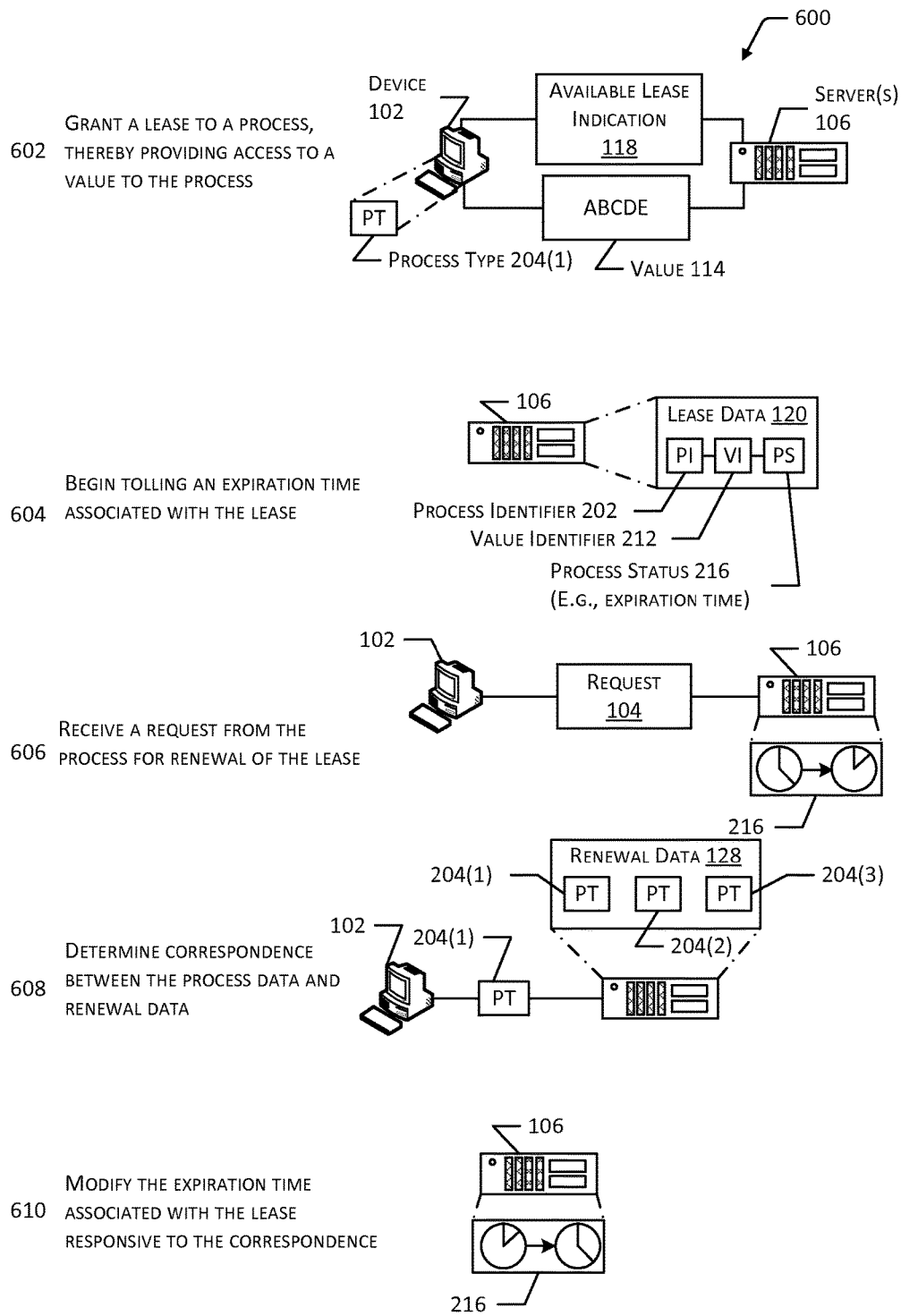
FIG. 6 is a scenario for renewing a lease granted to a process responsive to a request from the process, based on correspondence between renewal data and process data.

FIG. 6 depicts a scenario 600 for renewing a lease granted to a process based on correspondence between renewal data 128 and process data 110. At 602, a lease is granted to a process implemented by a device 102, thereby providing access to a value 114. The process is shown having a process type 204(1) associated therewith. One or more servers 106 are depicted providing an available lease indication 118 and access to a value 114 to the process.

At 604, an expiration time associated with the lease may begin tolling. In some implementations, a process status 216 associated with the lease may include an expiration time. For example, the server(s) 106 are shown storing lease data 120, which includes a process identifier 202 associated with the process stored in association with a value identifier 212 associated with the value 114. A process status 216, which may include an expiration time, is stored in association with the process identifier 202 and the value identifier 212, such that the process status 216 may indicate a length of time remaining before the lease to the process to access the value 114 will be revoked, absent renewal thereof.

At 606, a request 104 from the process for renewal of the lease may be received by the server(s) 106. For example, FIG. 6 depicts the process status 216 including an expiration time that is proximate to lapsing but has not yet lapsed. In some implementations, a request 104 for renewal of a lease may be received prior to a lapse of the expiration time, thereby enabling renewal of the lease prior to revocation thereof. In other implementations, the server 106 may automatically determine whether a lease granted to a process is eligible for renewal in the absence of a request 104 from the process. For example, 606 may be omitted.

At 608, correspondence between the process type 204(1) of the process data 110 and the renewal data 128 may be determined. For example, FIG. 6 depicts the renewal data 128 including a first process type 204(1), a second process type 204(2), and a third process type 204(3). Any of the process types 204 included in the renewal data 128 may be eligible for renewal of a lease associated therewith. The process type 204(1) determined from the process implemented on the device 102 is identical to the first process type 204(1) of the renewal data 128. As such, correspondence between the process type 204(1) of the process and the renewal data 128 may be determined, and the lease granted to the process may be renewed.

At 610, the expiration time associated with the lease may be modified responsive to the correspondence between the process data 110 and the renewal data 128. In the depicted scenario 600, the server(s) 106 are shown increasing the expiration time indicated in the process status 216 to its initial value. In other implementations, an expiration time may be increased beyond its initial value or decreased, or use of an expiration time may be discontinued, based on the process data 110 determined from the process or the renewal data 128.

FIG. 7 depicts a scenario 700 by which a lease granted to a process may be renewed based on renewal data 128 indicative of previous revocation of the lease due to a lapse in expiration time. At 702, a lease is granted to a process, thereby providing access to a value 114. An expiration time associated with the lease may begin tolling. For example, FIG. 7 depicts a device 102 implementing a process having a process identifier 202 associated therewith. One or more servers 106 are shown providing an available lease indication 118 and access to a value 114 to the process. A process status 216 associated with the lease, which may include an expiration time, is shown stored in the server(s) 106.

At 704, a lapse of the expiration time may be determined, and the lease to the process may be revoked. FIG. 7 depicts the expiration time associated with the process status 216 lapsing, and termination of the connection between the device 102 implementing the process and the server(s) 106.

At 706, renewal data 128 indicative of the process for which the lease was revoked may be generated. Specifically, the server(s) 106 are shown generating renewal data 128 that includes the process identifier 202 associated with the process for which the lease was revoked.

At 708, a subsequent lease may be granted to the process. In the depicted scenario 700, the server(s) 106 are shown providing an available lease indication 118 to the device 102 implementing the process. The process identifier 202 of the process is shown associated with the device 102. If a lease to access the value 114 is not available when the process requests the subsequent lease, the connection with the process may be terminated. An unavailable lease indication 132 may be provided to the device 102. In some implementations, the device 102 or the server(s) 106 may periodically reestablish the connection to determine the availability of a lease. In other implementations, when a lease becomes available, the server(s) 106 or device 102 may attempt to reestablish the connection to provide a lease to the process. Queue data 324 may be generated, and may include process identifiers 202 associated with one or more processes that have requested a lease to access a value 114 at a time when a lease was not available. The server(s) 106 may access the queue data 324 periodically or at a time when a lease becomes available to determine one or more processes with which to reestablish a connection to attempt to grant a lease. In some implementations, processes having process identifiers 202 stored as queue data 324 may be granted a lease to access a value 114 prior to processes not associated with the queue data 324.

At 710, the expiration time associated with the lease may be modified based on the renewal data 128. For example, the process identifier 202 associated with the process implemented by the device 102 may be determined by the server(s) 106. Correspondence between the process identifier 202 of the process and the process identifier 202 stored as renewal data 128 may be determined. Responsive to the correspondence, the expiration time associated with the lease may be increased or decreased, as described previously.

Figure 8:
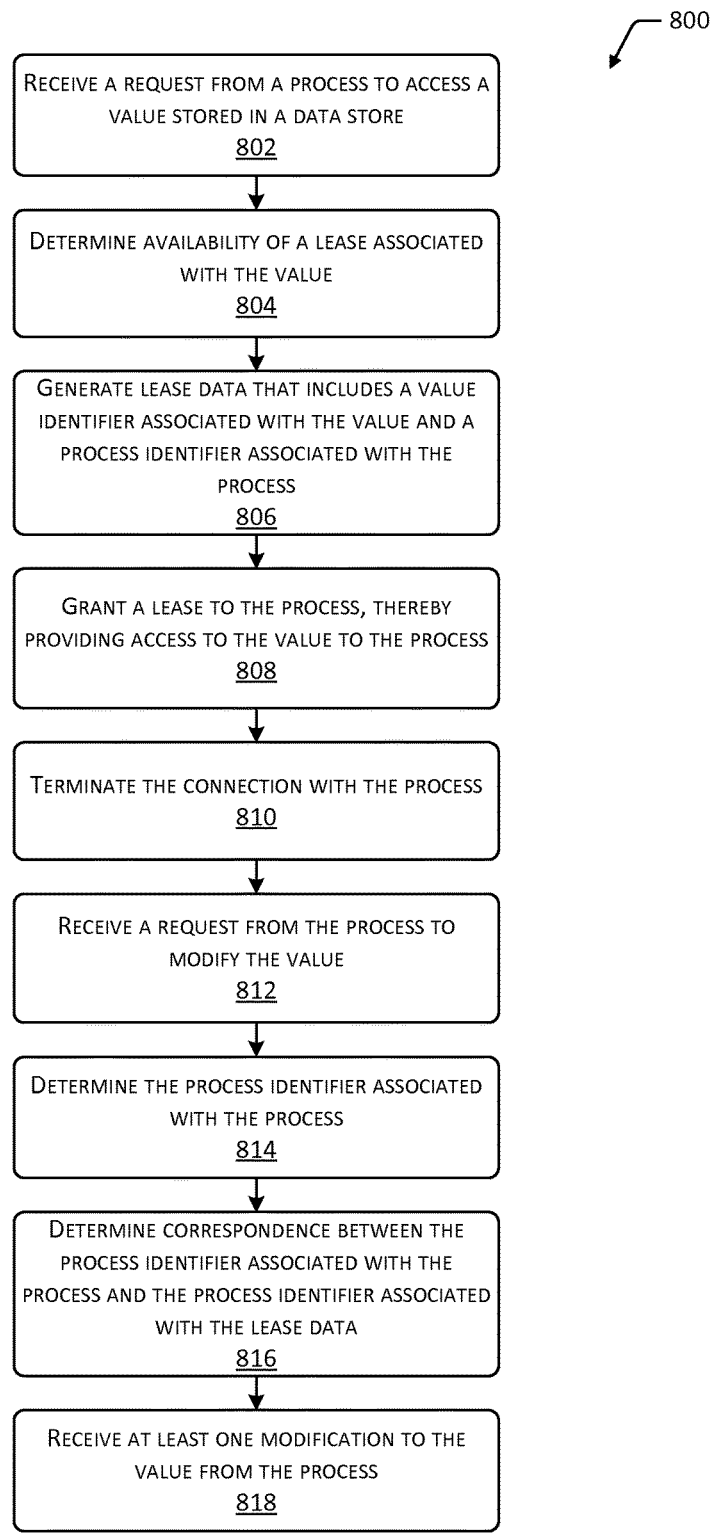
FIG. 8 is a flow diagram illustrating a process for granting leases to access values to processes and receiving modifications to values.

FIG. 8 depicts a flow diagram 800 illustrating a process for granting leases to access values to processes and receiving modifications to values. Block 802 receives a request 104 from a process to access a value 114 stored in a data store 320 of a computing device 302. For example, a device 102 implementing a process may establish a data connection with one or more servers 106 or other computing devices 302. The process may provide a request 104 for a lease to access one or more values 114 via the data connection.

Block 804 determines availability of a lease associated with the value 114. In some implementations, a value 114 may be restricted to access by a single process at a particular time. In other implementations, a value 114 may be accessed by multiple processes at a particular time; however, only a single process may be permitted to modify the value 114. For example, to determine availability of the lease, one or more servers 106 or other computing devices 302 may determine a current count 406 of processes for which a lease to access a value 114 has been granted, and a maximum count 408 of processes permitted to access the value 114. If the current count 406 is less than the maximum count 408, a lease may be determined to be available. For example, upon the grant of a lease to the process, an available lease indication 118 may be provided to the device 102 implementing the process.

Block 806 generates lease data 120 that includes a value identifier 212 associated with the value 114 and a process identifier 202 associated with the process. For example, process data 110 associated with the process may include the process identifier 202, a process type 204, a device identifier 206, a user identifier 208, and so forth. At least a portion of the process data 110 may be determined by the server(s) 106 or other computing devices 302 when a lease is granted to the process. Value data 112 associated with a value 114 may also include a value identifier 212. Storage of a process identifier 202 associated with a process and a value identifier 212 associated with a value 114 in association with one another as lease data 120 may serve as an indication of the lease granted to the process. The lease data 120 may further include a process status 216 associated with the lease or with the process. For example, a process status 216 may indicate a process that is currently active, a process that has failed, a process to which a lease has been revoked, an expiration time associated with a lease, and so forth.

Block 808 grants a lease to the process, thereby providing access to the value 114 to the process. In some implementations, the value 114 may be provided to the device 102 implementing the process or to a storage medium in communication with the process. Provision of the value 114 to a medium accessible by the process may enable the process to act on the value 114 in the absence of a connection to the server(s) 106 or other computing devices 302.

Block 810 terminates the connection with the process. For example, subsequent to provision of the value 114 to a medium accessible by the process, an open connection between the process and the server(s) 106 or other computing devices 302 is not necessary to enable the process to act on the value 114. In some implementations, a number of connections or connection-based resources may be the limiting factor regarding the maximum throughput of a system 100. As such, termination of a connection with a process after granting the lease to the process, e.g., while the process acts on a value 114, may enable the connection to be used for other purposes. In other implementations, a connection may be maintained between the process and the system 100, and Block 810 may be omitted.

Block 812 receives a request 104 from the process to modify the value 114. For example, the server(s) 106 or other computing devices 302 may receive a request 104 from the device 102 implementing the process to reestablish a data connection. The process may provide a modification to the value 114, a different value 114 to replace the current value 114, or may modify the value 114 by acting upon the value 114 in another manner. For example, the process may delete the value 114, set the value 114 to null, merge the value 114 with one or more other values 114, divide the value 114 into multiple values 114, and so forth.

Block 814 determines the process identifier 202 associated with the process. For example, in addition to the request 104 and a modification to the value 114, at least a portion of the process data 110 associated with the process may be provided to the server(s) 106 or other computing devices 302. Continuing the example, the process identifier 202 associated with the process may be used to identify the process, and to determine that the process requesting to modify the value 114 was previously granted a lease to access the value 114.

Block 816 determines correspondence between the process identifier 202 associated with the process and the process identifier 202 associated with the lease data 120. For example, the process identifier 202 determined from the process at the time the lease is granted may be stored as lease data 120. When the same process subsequently provides a request 104 to modify the value 114, an identical process identifier 202 may be determined from the process. Responsive to correspondence between the two process identifiers 202, access to modify the value 114 may be granted.

Block 818 receives one or more modifications to the value 114 from the process. The process may modify the value 114 by updating the value 114, replacing the value 114, deleting the value 114, merging the value 114, dividing the value 114, and so forth.

Figure 9:
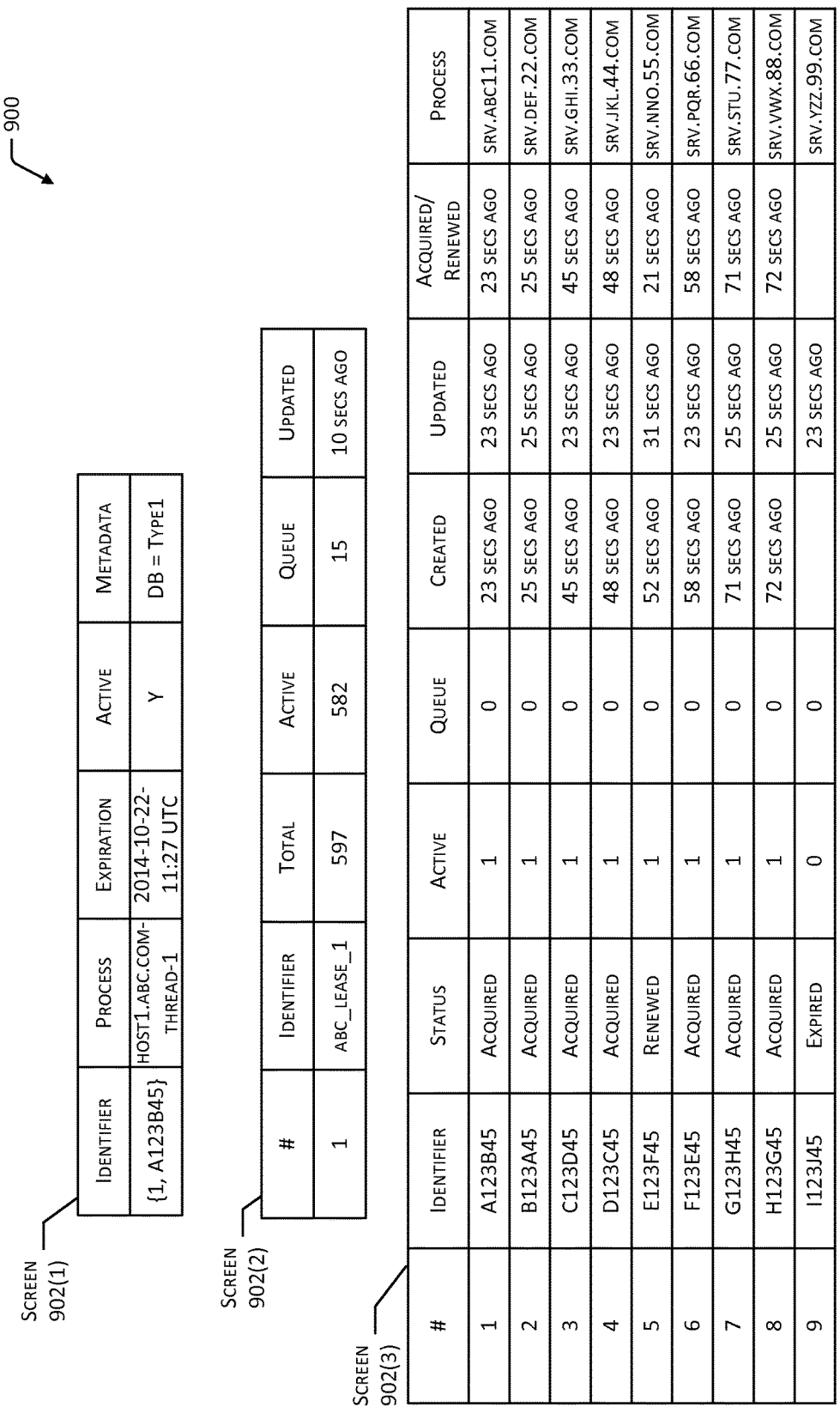
FIG. 9 illustrates an implementation of an example user interface displaying statuses of leases provided to processes.

In some implementations, a status of one or more leases granted to one or more processes may be provided to an output device, such as a display associated with a device accessing the system 100. FIG. 9 depicts multiple example screens 902 displaying status information regarding leases, which may be viewed by a user associated with the lease management system.

A first screen 902(1) is illustrated as a table that includes an identifier, such as a key, associated with a lease. A name or identifier of a process to which the lease has been granted may be shown adjacent to the lease identifier. The depicted first screen 902(1) also includes an expiration time (e.g., a date and time) corresponding to the lease. The first screen 902(1) is also shown including an indication regarding whether the lease or process is active. Metadata, such as an indication of the type or location of the data structure containing the value 114 for which the lease has been granted may also be included.

A second screen 902(2) is illustrated as a table that includes an identifier of a lease, shown in association with a total number of processes accessing or attempting to access the value 114 associated with the lease. Specifically, a count of "active" processes (e.g., processes to which a lease has currently been granted) are shown. Also shown is a count of "queue" processes that have requested a lease, but to which a lease has not been granted. Queued processes may periodically attempt to reestablish a connection with the system 100 to acquire a lease. The second screen 902(2) is also shown including an indication regarding the most recent instance at which the displayed data was updated (e.g., "10 secs ago.")

A third screen 902(3) depicts multiple identifiers, each associated with a lease, alongside an indication of the status of each lease. For example, a lease may be "acquired" (e.g., granted to a process), "renewed" (e.g., renewed by a process or by the system 100 prior to expiration of the lease), "expired," and so forth. A number of "active" and "queue" processes associated with the leases may also be displayed. The depicted third screen 902(3) also includes an indication regarding the time at which each lease entry was created (e.g., the time at which a lease was granted), and the time at which each lease entry was most recently updated. The third screen 902(3) is also shown including an indication regarding the time at which each lease was acquired or renewed. While each of the times is depicted as a relative length of time (e.g., "23 secs ago"), in some implementations a time may be expressed as an absolute time (e.g., 10-22-2014-12:08 UTC). The third screen 902(3) is further shown including a name or identifier of a process or host associated with the lease.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
 a hardware processor and a computer-readable storage medium; and
 instructions in the computer-readable storage medium for instructing the hardware processor to:
  establish a data connection via one or more networks with a service executing on one or more devices;
  receive a request, from a process associated with the service, for a lease to access a stored value;
  determine availability of the lease by determining a count of processes currently accessing the stored value;
  determine a process identifier corresponding to the process;
  provide a lease to the process, thereby providing access to the stored value to the process;
  generate lease data comprising the process identifier and a value identifier associated with the stored value;
  terminate the data connection with the service;
  reestablish the data connection with the service;
  receive, from the service, a second value and the process identifier;
  determine correspondence between the process identifier associated with the second value and the process identifier of the lease data;
  in response to the correspondence, replace the stored value with the second value; and
  terminate the lease to the process.

2. The system of claim 1, wherein the instructions further instruct the hardware processor to determine availability of the lease by:
  determining a maximum count of processes associated with the stored value; and
  determining the count of processes to be less than the maximum count of processes.

3. The system of claim 1, wherein the instructions further instruct the hardware processor to:
  determine a version identifier associated with the stored value;
  determine a version identifier associated with the second value received from the process;
  determine correspondence between the version identifier associated with the stored value and the version identifier associated with the second value; and
  replace the version identifier with a modified version identifier, wherein the stored value is replaced with the second value responsive to the correspondence.

4. The system of claim 1, wherein the instructions further instruct the hardware processor to:
  determine an expiration time associated with the lease;
  determine a process type associated with the process;
  access renewal data comprising the process type;
  determine correspondence between the process type associated with the process and the process type of the renewal data; and
  modify the expiration time responsive to the correspondence.

5. A method comprising:
  receiving requests from one or more processes to access a stored value;
  determining a count of processes accessing the stored value;
  determining a threshold number of processes associated with the stored value;
  determining, using one or more hardware processors, the count of processes to be less than the threshold number of processes;
  providing a lease to at least a subset of the one or more processes, thereby providing access to the stored value to the at least a subset of the one or more processes;
  terminating a connection associated with at least one process of the subset;
  receiving at least one modification from the at least one process of the subset;
  determining that the lease is associated with the at least one process of the subset;
  in response to determining that the lease is associated with the at least one process, reestablishing the connection with the at least one process of the subset;
  determining the at least one modification to be a first modification received in association with the stored value; and
  in response to determining that the at least one modification is associated with the stored value, modifying the stored value using the at least one modification responsive to the correspondence to form a modified value.

6. The method of claim 5, wherein the stored value comprises a first version identifier associated therewith, the method further comprising:
  receiving the first version identifier from the at least one process of the subset;
  determining the at least one modification to be the first modification by determining correspondence between the first version identifier associated with the at least one modification and the first version identifier associated with the stored value; and
  modifying the first version identifier to form a second version identifier.

7. The method of claim 6, further comprising:
  receiving an additional modification from at least one additional process of the one or more processes, wherein the additional modification comprises the first version identifier associated therewith;
  determining a lack of correspondence between the first version identifier and the second version identifier; and
  one or more of: providing the modified value to the at least one additional process, providing an indication of an unsuccessful modification to the at least one additional process, or modifying the modified value based on the additional modification.

8. The method of claim 5, further comprising:
  generating lease data comprising a value identifier corresponding to the stored value and one or more process identifiers corresponding to the at least a subset of the one or more processes; and
  providing the lease data to a display device, wherein the lease data indicates a status of one or more leases.

9. The method of claim 5, further comprising:
  determining an expiration time corresponding to the lease;
  receiving a request from a process of the at least a subset of the one or more processes for renewal of the expiration time;
  determining one or more of a process type, a user identifier, or a device identifier associated with the process;
  accessing renewal data comprising one or more of:
  at least one process type,
  at least one user identifier, or
  at least one device identifier;
  determining a correspondence between the renewal data and the one or more of the process type, the user identifier, or the device identifier;
  determining that the expiration time is within an expiration threshold; and
  modifying the expiration time to prevent expiration thereof.

10. The method of claim 5, further comprising:
  determining a first expiration time corresponding to the lease;
  determining a lapse of the expiration time;
  revoking the lease from a process of the subset;
  storing renewal data indicative of the lapse of the expiration time in association with a process identifier corresponding to the process of the subset;
  receiving a second request from the process of the subset to access the stored value;
  determining a second expiration time corresponding to the lease;
  receiving the process identifier from the process of the subset;
  determining correspondence between the process identifier associated with the process of the subset and the process identifier associated with the renewal data; and
  modifying the expiration time responsive to the correspondence.

11. The method of claim 5, further comprising:
  establishing a connection with at least one additional device;
  receiving a request from at least one additional process associated with the at least one additional device to access the stored value;

determining the count of processes to be greater than or equal to the threshold number of processes;

storing a processes identifier associated with the at least one additional process as queue data; and terminating the connection with the at least one additional device.

12. The method of claim 5, wherein providing access to the stored value comprises:

establishing one or more connections with the at least a subset of the one or more processes;

providing the stored value to the at least a subset of the one or more processes;

storing lease data comprising a value identifier corresponding to the stored value and one or more process identifiers corresponding to the at least a subset of the one or more processes; and terminating the one or more connections with the at least a subset of the one or more processes.

13. The method of claim 12, wherein receiving the at least one modification from the at least one process of the subset comprises:

receiving a process identifier from the at least one process of the subset;

determining correspondence between the process identifier from the at least one process and the one or more process identifiers of the lease data; and reestablishing the connection with the at least one process responsive to the correspondence.

14. A non-transitory computer-readable medium comprising instructions for causing a hardware processor to perform the method of:

receiving a request from a process to access a value stored in a data store;

determining availability of a lease associated with the value;

generating lease data comprising a value identifier associated with the value and a process identifier associated with the process;

establishing a connection with a device associated with the process;

granting a lease to the process, thereby providing access to the value to the process;

terminating the connection with the device;

receiving a request from the process to modify the value;

determining the process identifier associated with the process;

determining correspondence between the process identifier associated with the process and the process identifier associated with the lease data;

in response to the correspondence, reestablishing the connection with the device responsive to the correspondence;

receiving at least one modification to the value from the process; and modifying the value using the at least one modification to form a modified value.

15. The computer-readable medium of claim 14, wherein the instructions further cause the hardware processor to determine availability of the lease associated with the value by:

determining a value identifier associated with the value; and determining a lack of correspondence between the value identifier associated with the value and the value identifier of the lease data.

16. The computer-readable medium of claim 14, wherein the instructions further cause the hardware processor to determine availability of the lease associated with the value by:

determining, from the lease data, a count of processes accessing the value;

determining, from value data associated with the value, a maximum count of processes for accessing the value; and determining the count of processes to be less than the maximum count of processes.

17. The computer-readable medium of claim 16, wherein the instructions further cause the hardware processor to:

access a first version identifier associated with the value;

modify the first version identifier to form a second version identifier associated with the modified value;

receive a request from an additional process to modify the value;

determine the first version identifier from the value associated with the additional process;

determine a lack of correspondence between the first version identifier and the second version identifier; and one or more of: provide the modified value to the additional process or modify the modified value using at least one additional modification received from the additional process.

18. The computer-readable medium of claim 14, wherein the instructions further cause the hardware processor to:

determine an expiration time corresponding to the lease data;

determine a process type associated with the process;

access renewal data comprising process type;

determine correspondence between the process type associated with the process and the process type of the renewal data; and modify the expiration time responsive to the correspondence.

19. The computer-readable medium of claim 14, wherein the instructions further cause the hardware processor to:

determine an expiration time corresponding to the lease data;

determine one or more of: a number of instances the process previously requested to access the value or a number of instances the expiration time previously lapsed; and modify the expiration time responsive to the one or more of the number of instances the process previously requested to access the value or the number of instances the expiration time previously lapsed.

20. The computer-readable medium of claim 14, wherein the instructions further cause the processor to:

receive a request from an additional process to access the value;

determine unavailability of the lease associated with the value;

generate queue data comprising an additional process identifier associated with the additional process and the value identifier;

terminate a connection with the additional process;

reestablish the connection with the additional process;

receive an additional request from the additional process to access the value; and determine availability of the lease associated with the value.

* * * * *